(12) United States Patent
Haraguchi et al.

(10) Patent No.: US 11,893,101 B2
(45) Date of Patent: Feb. 6, 2024

(54) WEARABLE CAMERA, USER AUTHENTICATION SYSTEM AND USER AUTHENTICATION METHOD

(71) Applicant: i-PRO Co., Ltd., Tokyo (JP)

(72) Inventors: Takayuki Haraguchi, Fukuoka (JP); Manabu Nakamura, Fukuoka (JP); Masashi Nakamura, Fukuoka (JP); Shinichi Arai, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 630 days.

(21) Appl. No.: 17/124,176

(22) Filed: Dec. 16, 2020

(65) Prior Publication Data

US 2021/0224373 A1 Jul. 22, 2021

(30) Foreign Application Priority Data

Jan. 20, 2020 (JP) .................................. 2020-007060

(51) Int. Cl.
| | | |
|---|---|---|
| *G06F 21/34* | (2013.01) | |
| *H04N 7/18* | (2006.01) | |
| *G06K 7/14* | (2006.01) | |
| *G06F 1/16* | (2006.01) | |
| *G06V 40/16* | (2022.01) | |
| *H04N 23/667* | (2023.01) | |

(52) U.S. Cl.
CPC .............. *G06F 21/34* (2013.01); *G06F 1/163* (2013.01); *G06K 7/1443* (2013.01); *G06V 40/172* (2022.01); *H04N 7/185* (2013.01); *H04N 23/667* (2023.01); *G06F 2221/2117* (2013.01)

(58) Field of Classification Search
CPC .. G06F 21/34; G06F 1/163; G06F 2221/2117; H04N 7/185; H04N 23/667
See application file for complete search history.

(56) References Cited

U.S. PATENT DOCUMENTS

| | | | |
|---|---|---|---|
| 2009/0293110 A1 | 11/2009 | Koga | |
| 2015/0199549 A1* | 7/2015 | Lei ...................... | G06K 7/10722 235/462.24 |
| 2016/0119663 A1* | 4/2016 | Yamaguchi ...... | H04N 21/41422 725/30 |
| 2016/0344983 A1* | 11/2016 | Yoshimura ............... | H04N 5/77 |

(Continued)

FOREIGN PATENT DOCUMENTS

| | | |
|---|---|---|
| JP | 2007199860 A | 8/2007 |
| JP | 2009282734 A | 12/2009 |

(Continued)

OTHER PUBLICATIONS

Japanese Notice of Reasons for Refusal, dated Sep. 11, 2023, for Japanese Patent Application No. 2020-007060. (8 pages).

*Primary Examiner* — Esther B. Henderson
(74) *Attorney, Agent, or Firm* — Seed IP Law Group LLP

(57) ABSTRACT

A wearable camera is to be worn by a user and includes: a capturing unit configured to capture and read a code in which fixed information and variable information of the user are registered; and a processor configured to extract the fixed information and the variable information of the user based on a read result of the capturing unit. The processor is configured to register the extracted fixed information and variable information of the user in a memory, and permit the user to use the wearable camera based on the registration in the memory.

10 Claims, 10 Drawing Sheets

(56) References Cited

U.S. PATENT DOCUMENTS

2018/0314861 A1* 11/2018 Guzik .................. G06F 16/381
2020/0215840 A1* 7/2020 Jung .................... B42D 25/305

FOREIGN PATENT DOCUMENTS

| JP | 2015179221 A | 10/2015 | |
|---|---|---|---|
| JP | 5857276 B1 * | 2/2016 | |
| JP | 5857276 B1 | 2/2016 | |
| JP | 2019057288 A | 4/2019 | |
| WO | WO-2017136940 A1 * | 8/2017 | ........... A61B 5/6803 |

* cited by examiner

WEARABLE CAMERA, USER AUTHENTICATION SYSTEM AND USER AUTHENTICATION METHOD

BACKGROUND OF THE INVENTION

1. Field of the Invention

The present disclosure relates to a wearable cameras, a user authentication system, and a user authentication method.

2. Background Art

JP-B-5857276 discloses an authentication system including a plurality of wearable cameras, a tag reader configured to read a tag attached to each wearable camera, and an information processing device configured to authenticate a user of the wearable camera. In this authentication system, the tag reader reads the tag when the wearable camera is placed at a predetermined position and extracts identification information of the wearable camera. The information processing device, when the wearable camera is placed at the predetermined position, displays a login screen that prompts the user to enter his/her own identification information, and, when the user inputs his/her own identification information, registers the identification information extracted by the tag reader and the user identification information input by the user in association with each other, so as to enable the user to start using the wearable camera.

SUMMARY OF THE INVENTION

In the configuration in JP-B-5857276, before the wearable camera is used (in other words, before user authentication for a police officer is normally completed), each police officer is required to enter user identification information (for example, an ID and a password for login). Therefore, a predetermined operation time (for example, about 5 minutes per person) is required for user authentication. In many cases, quick dispatch is required for the police officers to perform duties, and it is preferable to avoid as much as possible a long operation time in user authentication in the wearable cameras. That is, in the related art, it is difficult to quickly authenticate the user of the wearable camera to be used by the police officer. In addition, the duties of the police officer are often changed daily, and it is preferable that the duties schedule of the day is set by user authentication in the wearable camera, but such setting is not considered in JP-B-5857276.

The present disclosure is proposed in view of the above circumstances in the related art, and an object thereof is to provide a wearable camera, a user authentication system, and a user authentication method which efficiently and quickly perform user authentication including setting of a user work schedule that can be changed daily, and support improvement of user work efficiency.

The present disclosure provides a wearable camera that is wearable by a user, the wearable camera including: a memory, a capturing unit that is configured to capture and read a code in which fixed information and variable information of the user are registered; and a processor that is configured to extract the fixed information and the variable information of the user based on a read result of the capturing unit, in which the processor is configured to register the extracted fixed information and variable information of the user in the memory, and permit the user to use the wearable camera based on the registration in the memory.

In addition, the present disclosure provides a user authentication system including a wearable camera that is wearable by a user and an information processing device that is communicatively connected to the wearable camera. The information processing device has a first processor that is configured to send a request to a database to acquire fixed information and variable information of a user whose login has been successfully completed, the database that stores data including fixed information and variable information for each user, a communication unit that is configured to receive the fixed information and the variable information of the user sent from the database based on the request, and a display that is configured to display a code, including the fixed information and the variable information of the user, generated by the first processor. The wearable camera includes a capturing unit that is configured to capture and read the code displayed on the display, and a second processor that is configured to extract the fixed information and the variable information of the user based on a read result of the capturing unit. The second processor is configured to register the extracted fixed information and variable information of the user in a memory, and permit the user to use the wearable camera based on the registration in the memory.

Further, the present disclosure provides a user authentication method performed by a wearable camera that is wearable by a user, the user authentication method including: capturing and reading, by a capturing unit of the wearable camera, a code in which fixed information and variable information of the user are registered; extracting the fixed information and the variable information of the user based on a read result of the capturing unit; and registering the extracted fixed information and variable information of the user in a memory, and permitting the user to use the wearable camera based on the registration in the memory.

According to the present disclosure, user authentication including setting of a user work schedule that can be changed daily can be efficiently and quickly performed, and the improvement of user work efficiency can be supported.

DETAILED DESCRIPTION OF THE EXEMPLARY EMBODIMENT

Hereinafter, an embodiment in which a wearable camera, a user authentication system, and a user authentication method according to the present disclosure are specifically disclosed will be described in detail with reference to the drawings as appropriate. However, unnecessary detailed description may be omitted. For example, detailed description of a well-known matter or repeated description of substantially the same configuration may be omitted. This is to avoid unnecessary redundancy in the following description and to facilitate understanding for those skilled in the art. It should be noted that the accompanying drawings and the following description are provided for thorough understanding of the present disclosure by those skilled in the art, and are not intended to limit the subject matter recited in the claims.

Figure 1:
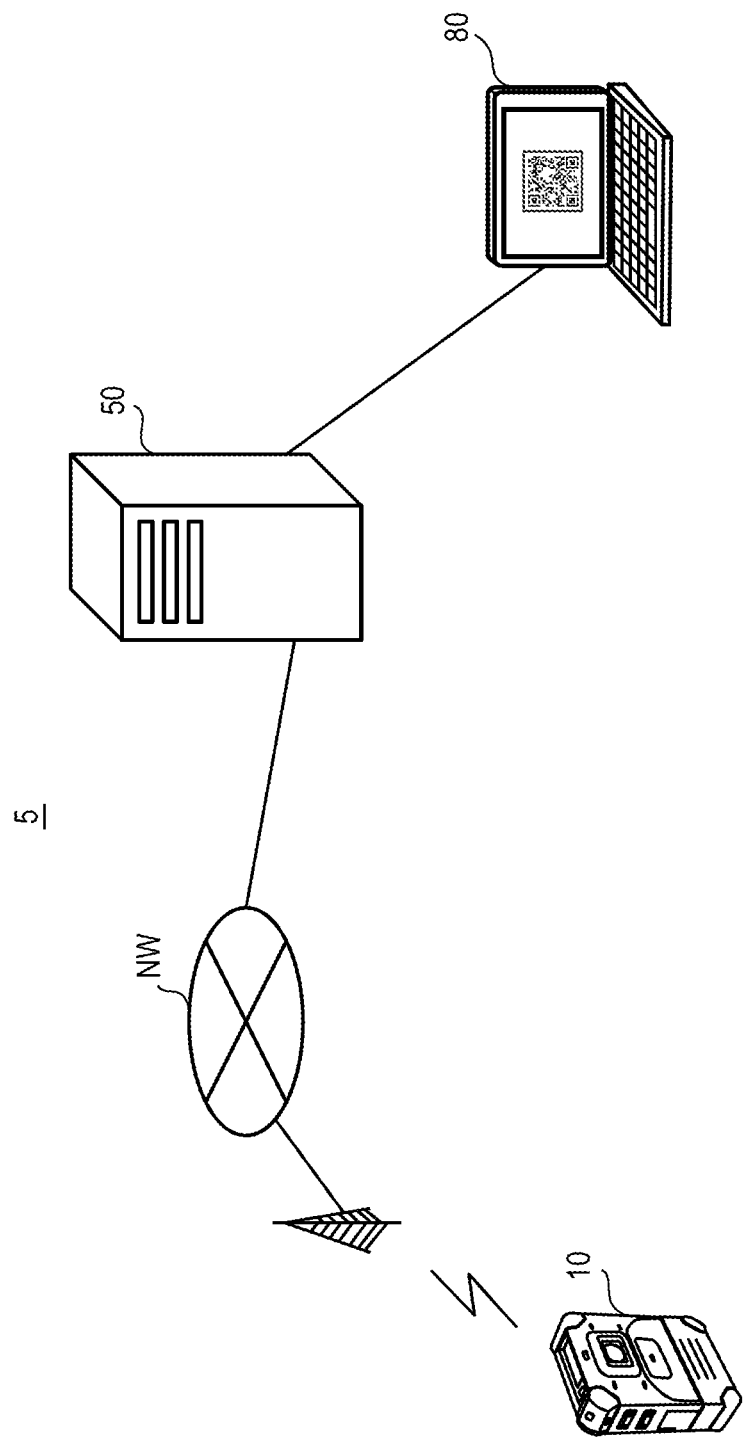
FIG. 1 is a diagram showing a configuration example of a user authentication system according to a first embodiment.

FIG. 1 is a diagram showing a configuration example of a user authentication system 5 according to a first embodiment. The user authentication system 5 includes a wearable camera 10, a back-end server 50, and a back-end client 80. Although only one wearable camera 10 is shown in FIG. 1 for simplification of the description, a plurality of wearable cameras 10 may be used in the user authentication system 5. In the first embodiment, the wearable camera 10 is to be used by a police officer as an example of a user. The user of the wearable camera 10 is not limited to a police officer, and the wearable camera 10 may be used by a security guard at various other business establishments (for example, a security company).

When a police officer 7 (see FIG. 6) wears the wearable camera 10 and is to dispatch for patrol to the scene of the incident or normal jurisdiction, the user authentication system 5 authenticates whether the police officer 7 may use the wearable camera 10, and performs processing for associating the police officer 7 with the wearable camera 10 when the authentication for the police officer 7 is normally completed. After the police officer 7 has been successfully authenticated by the user authentication system 5, the wearable camera 10 adds and stores identification information of the police officer 7 (for example, a police officer ID and a password) to captured video data of a target obtained by capturing. Accordingly, the back-end server 50, to which the captured video data is input from the wearable camera 10, can properly identify, for example, which police officer has used the wearable camera 10 to capture the captured video data obtained by the wearable camera 10. In addition, by adding the identification information of the police officer 7 (see above) to the captured video data, the back-end server 50 can accurately prevent a malicious third-party who passes as a police officer from viewing the captured video data.

The wearable camera 10 is worn to be fixed to the body or uniform of the police officer 7, and captures a surrounding target at the scene of an incident (for example, rubberneckers including a crowd of people at the scene of the incident), a patrol destination, or the like to generate the captured video data.

The back-end server 50 is installed in, for example, a police station 8 (see FIG. 6), stores the captured video data obtained by the wearable camera 10, and stores and manages work data (not shown) indicating a work status of the police officer. Although only one back-end server 50 is shown in FIG. 1, a plurality of back-end servers 50 may be provided to be able to communicate with the back-end client 80.

The back-end client 80 is composed of, for example, a personal computer (PC) installed in the police station 8 (see FIG. 6) and operable by the police officer 7. Although only one back-end client 80 is shown in FIG. 1, a plurality of back-end clients 80 may be provided to be able to communicate with the back-end server 50.

In addition to the identification information of the police officer (in other words, fixed information that is specific to the police officer and basically does not change), the wearable camera 10 stores information that is updated daily (for example, variable information such as a shift hour in which the police officer works). The wearable camera 10 is wirelessly connected to the back-end server 50 via a network NW. The back-end server 50 is connected to the back-end client 80 via wireless or wired.

Figure 2:
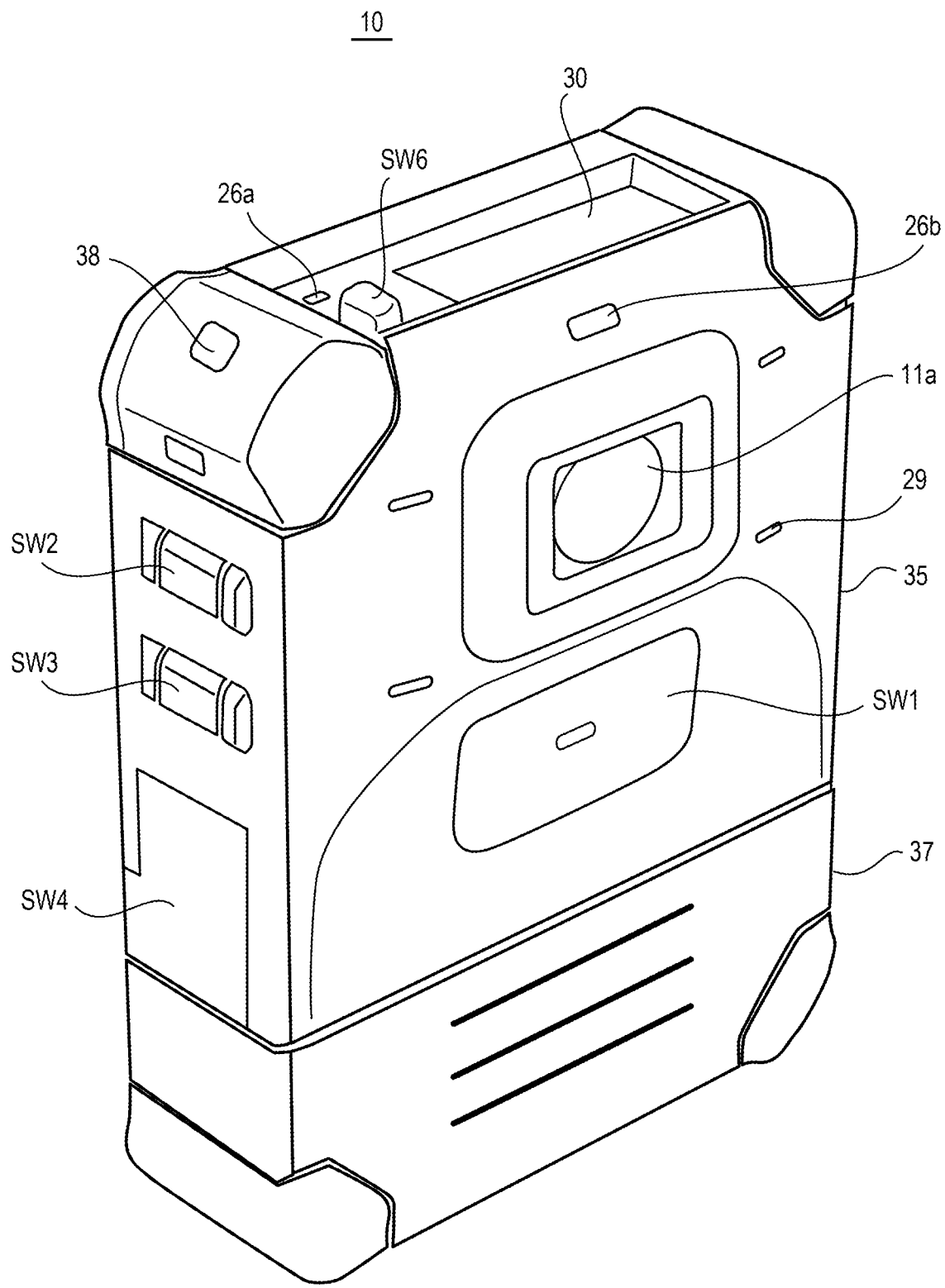
FIG. 2 is a perspective view showing an external example of a wearable camera.

FIG. 2 is a perspective view showing an external example of the wearable camera 10. The wearable camera 10 includes an upper housing 35 and a lower housing 37. The lower housing 37 is removable from the upper housing 35 by an operation of the police officer 7. The wearable camera 10 memorably captures, during the patrol, the status around (for example, in front) the police officer 7 in either a still image (image) or a moving image (video) data format, and stores the captured image data or the captured video data. The wearable camera 10 transmits the captured image data or the captured video data to the back-end server 50 in the police station 8 via wireless communication.

The wearable camera 10 is worn to be fixed to the body or uniform of the police officer 7 such that a target in the surroundings (for example, in front) can be captured as a video from a position close to a field of view of the police officer 7, such as the chest of the police officer 7. The police officer 7 captures a surrounding target while wearing the wearable camera 10.

In the wearable camera 10 in FIG. 2, a capturing lens 11a constituting a capturing unit, a recording switch SW1, a plurality of (for example, four) microphones 29, and a recording LED (light emitting diode) 26b are disposed on a front surface of a substantially rectangular housing thin in a front-rear direction (in other words, a thickness direction). The four microphones 29 are disposed radially around the capturing lens 11a in four different directions and collect a sound such that it can be determined that which direction a sound source of the sound collected by the wearable camera 10 is from. The microphone 29 is, for example, an electret condenser microphone (ECM microphone). The recording switch SW1 is to be pressed by the police officer 7 to start or end recording. The recording LED 26b is turned on when the recording is started by the operation of the police officer 7 (that is, during the recording of the captured image data or the captured video data), and is turned off when the recording is completed.

A liquid crystal display (LCD) 30, a display button SW6, and a mute LED 26a are disposed on an upper surface of the upper housing 35. When the display button SW6 is short-pressed by the operation of the police officer 7, a display content of the LCD 30 is switched (see FIG. 9). When the display button SW6 is long-pressed for a long time (for example, 3 seconds) by the operation of the police officer 7, an operation mode is transitioned to a default recording standby mode (an example of a normal operation mode) or a two-dimensional code read mode (that is, the operation mode is transitioned). The liquid crystal display 30 displays the operation mode (for example, the recording standby mode or the two-dimensional code read mode) of the wearable camera 10. The mute LED 26a is turned on when recording in a sound erased state (that is, in a state where there is no sound) is started by the operation of the police officer 7, and is turned off when the recording in the sound erased state is completed.

An audio mute button SW2, a multifunction button SW3, and battery release buttons SW4 are disposed on a right side surface of the upper housing 35 (a left side surface in the drawing). The audio mute button SW2 is a switch for erasing, when pressed by the operation of the police officer 7, sound data collected by the microphone 29 from the captured video data recorded by the wearable camera 10. The multifunction button SW3 is a switch for selecting various functions of the wearable camera 10. The battery release buttons SW4 are symmetrically disposed on left and right side surfaces of the upper housing 35, and are switches for releasing the lower housing 37 from the upper housing 35 (that is, separating the upper housing 35 and the lower housing 37) by pressing and denting inward the battery release buttons SW4 via the operation of the police officer 7.

A hole 38 for a strap is formed in a right corner of the upper housing 35. The police officer 7 can hang the wearable camera 10 by passing a strap (not shown) through the hole 38, and can easily hold the wearable camera 10 by hanging the strap around his/her neck or hooking the strap on a wall hook, for example.

The lower housing 37 houses a battery (not shown). The battery is a lithium ion battery as a secondary battery. The lithium ion battery outputs, for example, a battery voltage of 3.7 V (a voltage within a discharge range of 2.8 V to 4.2 V). As the secondary battery, a nickel hydrogen battery, a lithium ion solid solution battery, a nickel cadmium livestock battery, a sodium ion battery or the like may be used. The wearable camera 10 can be placed on a charging stand (not shown) with the lower housing 37 connected to the upper housing 35 so as to be charged. Further, the wearable camera 10 can be charged even when only the lower housing 37 removed from the upper housing 35 is placed on the charging stand (not shown).

Figure 3:
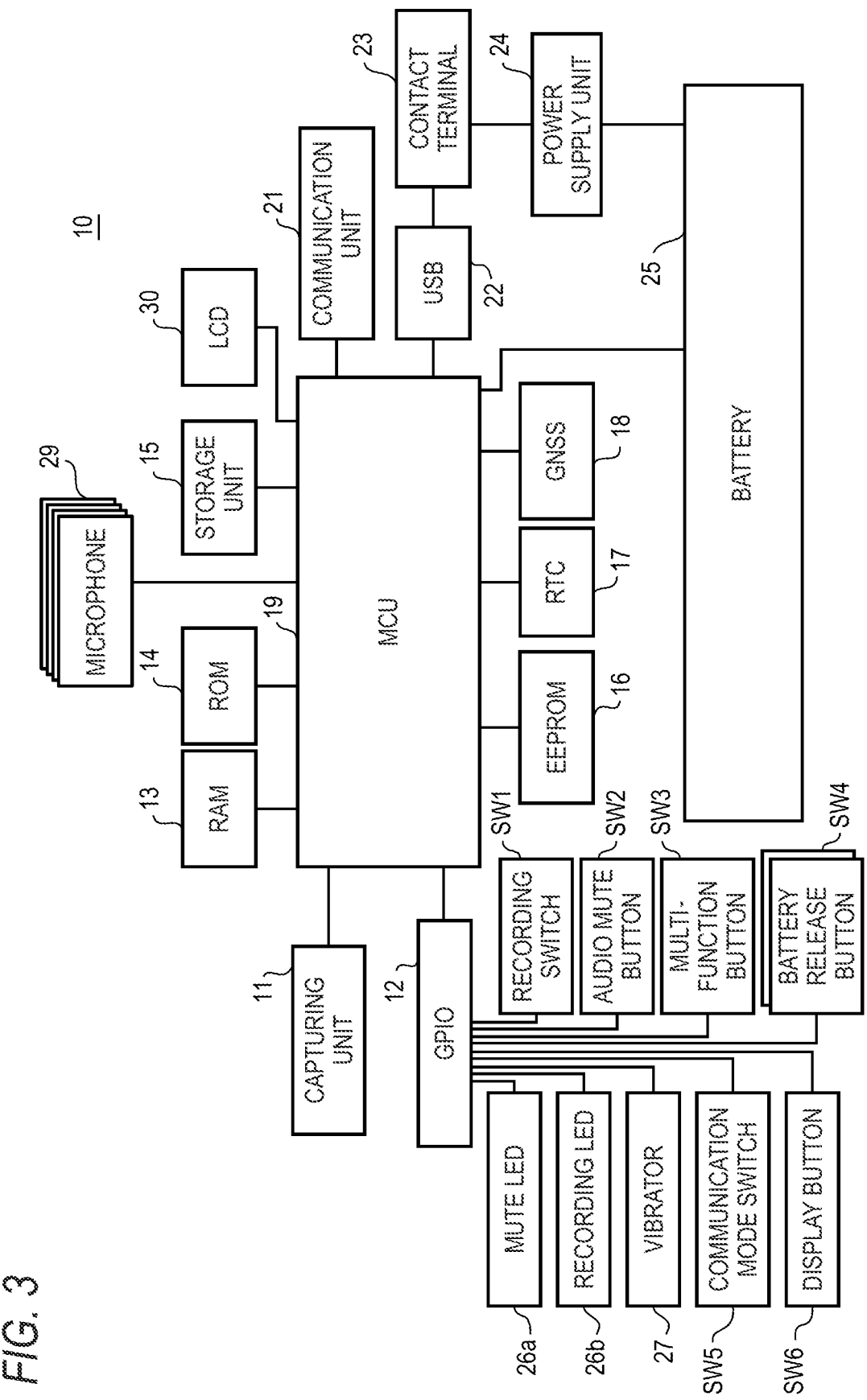
FIG. 3 is a block diagram showing a hardware configuration example of the wearable camera.

FIG. 3 is a block diagram showing a hardware configuration example of the wearable camera 10. The wearable camera 10 includes a capturing unit 11, a general purpose input/output (GPIO) 12, a random access memory (RAM) 13, a read only memory (ROM) 14, and a storage unit 15. The wearable camera 10 includes an electrically erasable program ROM (EEPROM) 16, a real time clock (RTC) 17, and a global navigation satellite system (GNSS) receiver 18. The wearable camera 10 includes a micro controller unit (MCU) 19, a communication unit 21, a universal serial bus (USB) 22, a contact terminal 23, a power supply unit 24, and a battery 25.

In addition, the wearable camera 10 includes the recording switch SW1, the audio mute button SW2, the multifunction button SW3, the battery release button SW4, a communication mode switch SW5, and the display button SW6. The wearable camera 10 includes the mute LED 26a, the recording LED 26b, and a vibrator 27.

The capturing unit 11 includes, for example, the capturing lens 11a and a solid-state image element using a charge coupled device (CCD) type image sensor or a complementary metal oxide semiconductor (CMOS) type image sensor or the like. The capturing unit 11 generates captured video data of the target obtained by capturing and outputs the captured video data to the MCU 19, and reads a two-dimensional bar code displayed on the back-end client 80 (for example, a QR code (registered trademark) in which shift change information of the police officer 7 described later is registered).

The GPIO 12 is a parallel interface and inputs and outputs signals between the recording switch SW1, the audio mute button SW2, the multifunction button SW3, the battery release button SW4, the communication mode switch SW5, the display button SW6, the mute LED 26a, the recording LED 26b, and the vibrator 27 with the MCU 19. Further, for example, various sensors (for example, an acceleration sensor capable of measuring an acceleration indicating a movement of a police officer equipped with the wearable camera 10) may be connected to the GPIO 12.

The RAM 13 is, for example, a work memory for use in an operation of the MCU 19. The shift change information (see FIG. 7) of the police officer 7, which will be described later, is stored in the RAM 13. The shift change information may be stored in a flash ROM. The ROM 14 is, for example, a memory for storing a program and data for controlling the MCU 19 in advance.

The storage unit 15 includes, for example, a storage medium such as an SD memory, and stores captured video data obtained by capturing using the capturing unit 11. When the SD memory is used as the storage unit 15, the SD memory can be attached to and detached from an SD memory insertion port provided in the housing of the wearable camera 10.

The EEPROM 16 stores, for example, identification information for identifying the wearable camera 10 (for example, a serial number as a Camera ID) and other setting information. Other setting information includes, for example, setting information on the back-end client 80, login information necessary for logging into the back-end server 50 constituting the user authentication system 5 (for example, Officer ID which is identification information of a police officer).

The RTC 17 clocks current time information and outputs the current time information to the MCU 19. The RTC 17 may be included in the MCU 19.

The global navigation satellite system (GNSS) receiver 18 calculates current position information and time information of the wearable camera 10 based on reception of a signal from a GNSS transmitter (not shown) and outputs the signal to the MCU 19. The time information may be used to correct a system time of the wearable camera 10. The GNSS receiver 18 may be included in the MCU 19.

The MCU 19 is a processor having a function as a control unit (controller) of the wearable camera 10, performs, for example, control processing for overall control of the operation of each part of the wearable camera 10, data input/output processing with each part of the wearable camera 10, data arithmetic (calculation) processing and data storage processing, and operates according to the program and data stored in the ROM 14. During the operation, the MCU 19 uses, for example, the RAM 13 to obtain the current time information from the RTC 17 and the current position information from the GNSS receiver 18.

The communication unit 21 defines the connection between the communication unit 21 and the MCU 19 in a physical layer, which is the first layer of an open systems interconnection (OSI) reference model, for example. The communication unit 21 performs wireless communication (for example, Wi-Fi (registered trademark)) via, for example, a wireless local area network (LAN) in accordance with this provision. In addition, the communication unit 21 may perform wireless communication such as near field communication (NFC) and Bluetooth (registered trademark), or wireless communication of wide area wireless communication (for example, long term evolution (LTE)) with the back-end server 50 via a mobile phone network (not shown).

The USB 22 is a serial bus, and is connected to, for example, an in car video system 60 mounted on a police vehicle such as a patrol car (see FIG. 6) or a PC such as the back-end client 80 in the police station 8.

The contact terminal 23 is a terminal for electrically connecting to a cradle (not shown) such as a charging stand or an external adapter (not shown). The contact terminal 23 is connected to the MCU 19 via the USB 22, and is also connected to the power supply unit 24. Since the wearable camera 10 is electrically connected to a cradle such as a charging stand via the contact terminal 23, the wearable camera 10 can be charged or communication of data such as captured video data can be performed via the contact terminal 23.

The contact terminal 23 is provided with, for example, a "charging terminal V+", a "CON.DET terminal", "data terminals D−, D+" and a "ground terminal" (all not shown). The CON.DET terminal is a terminal for detecting a voltage and a voltage change. The data terminals D−, D+ are terminals for transferring the captured video data or the like captured by the wearable camera 10 to an external PC or the like via, for example, a USB connector terminal.

By connecting the contact terminal 23 to a connector of the cradle (not shown) or the external adapter (not shown), data communication can be performed between the wearable camera 10 and an external device (for example, the above-mentioned cradle or external adapter).

The power supply unit 24 charges the battery 25 by supplying power supplied from the cradle or the external adapter to the battery 25 via, for example, the contact terminal 23. The battery 25 includes, for example, a rechargeable secondary battery, and supplies power to each part of the wearable camera 10.

The recording switch SW1 is, for example, a push button switch for inputting an operation instruction for starting/stopping recording (in other words, capturing a moving image) according to a pressing operation of the police officer 7. When the recording switch SW1 is pressed by the operation of the police officer 7, the wearable camera 10 is transitioned from the default recording standby mode to a recording mode. When the recording switch SW1 is pressed again by the operation of the police officer 7, the wearable camera 10 is transitioned from the recording mode to the recording standby mode.

The audio mute button SW2 is, for example, a push button switch for erasing the sound collected by the microphone 29 from the captured video data obtained by the capturing unit 11 (in other words, not adding the sound collected by the microphone 29 to the captured video data). The multifunction button SW3 is, for example, a push button switch to be pressed when using various functions of the wearable camera 10.

A pair of battery release buttons SW4 are provided on both side surfaces of the upper housing 35, for example, which are push button switches for removing the lower housing 37 from the upper housing 35 by being pushed inward by the operation of the police officer 7, for example.

The communication mode switch SW5 is, for example, a slide switch for inputting an operation instruction for setting a communication mode between the wearable camera 10 and an external device (for example, the back-end server 50, the back-end client 80, the cradle, or the external adapter). The configuration of the communication mode switch SW5 may be omitted from the wearable camera 10.

The display button SW6 is a push button switch for the MCU 19 to display the police officer ID of the police officer 7 on the LCD 30, for example, when short-pressed by the operation of the police officer 7, and for the MCU 19 to alternately switch between the recording standby mode and the two-dimensional code read mode displayed on the LCD 30 when long-pressed by the operation of the police officer 7.

The recording switch SW1, the audio mute button SW2, the multifunction button SW3, and the battery release buttons SW4 can be easily operated even in an emergency.

The mute LED 26a is, for example, a display unit for explicitly notifying a state where the sound is erased by pressing the audio mute button SW2 when a video is captured by the wearable camera 10.

The recording LED 26b is, for example, a display unit for explicitly notifying a state (recording state) of a capturing operation of the wearable camera 10.

The MCU 19 detects inputs of the audio mute button SW2, the multifunction button SW3, the battery release button SW4, the communication mode switch SW5, and the display button SW6, and processes the switch input that has been operated.

When the operation input of the recording switch SW1 is detected, the MCU 19 controls the start or stop of the capturing operation in the capturing unit 11, and stores (records) the captured video data obtained by the capturing unit 11 into the storage unit 15 as video data of the moving image (that is, performs recording processing on the captured video data).

When the operation input of the audio mute button SW2 is detected, the MCU 19 erases the sound from the captured video data obtained by the capturing unit 11 (that is, does not add the sound to the captured video data).

When the operation input of the multifunction button SW3 is detected, the MCU 19 executes various functions of the wearable camera 10.

The MCU 19 detects a state of the communication mode switch SW5 and operates the communication unit 21 in the communication mode corresponding to setting of the communication mode switch SW5.

Figure 9:
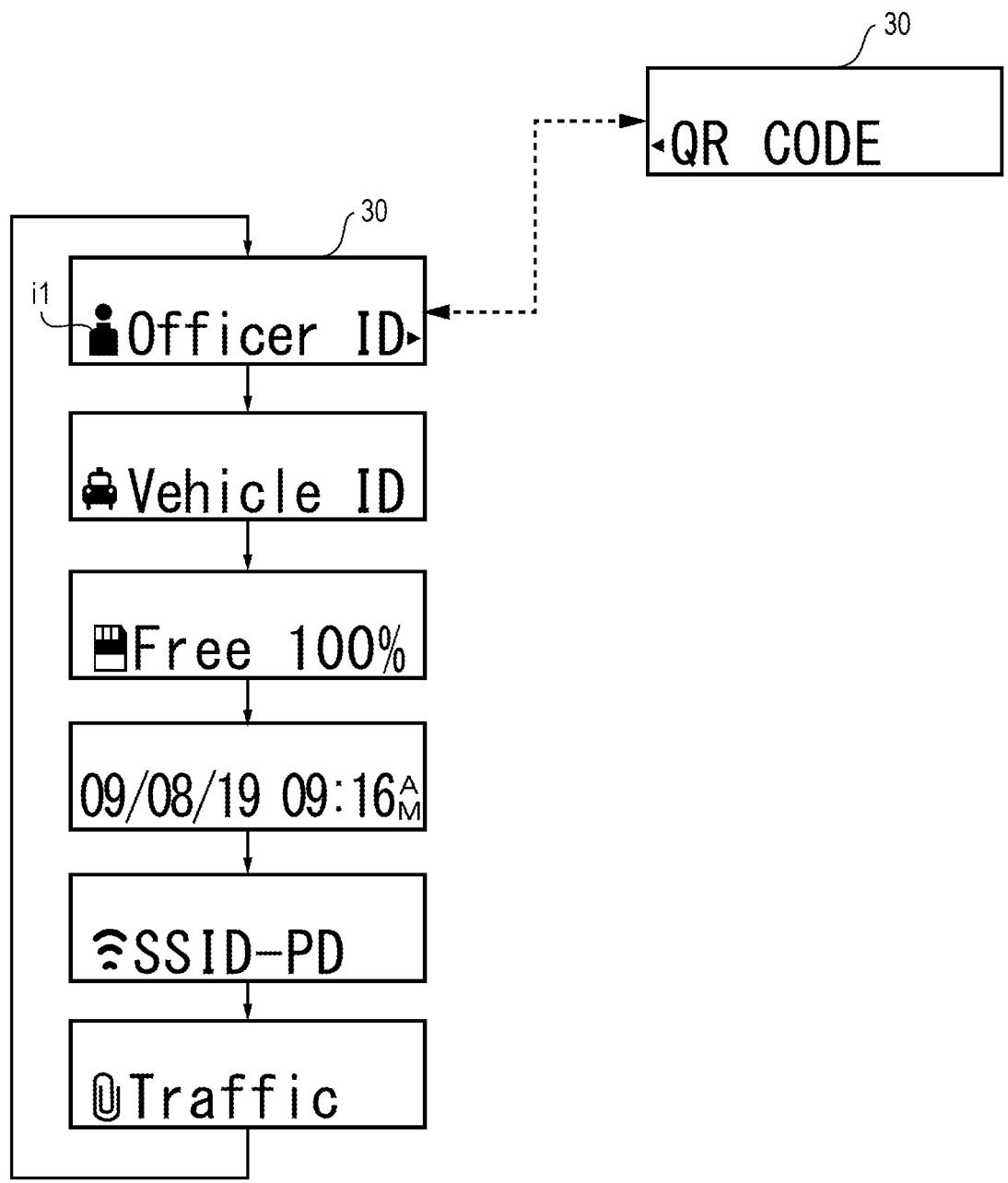
FIG. 9 is a diagram showing a screen transition displayed on an LCD of the wearable camera.

The MCU 19 detects the operation of short-pressing or long-pressing the display button SW6 by the operation of police officer 7, and displays the police officer ID on the LCD 30 when the display button SW6 is short-pressed, and alternately switches the operation mode of the wearable camera 10 between the recording standby mode and the two-dimensional code read mode displayed on the LCD 30 when the display button SW6 is long-pressed (see FIG. 9).

Figure 4:
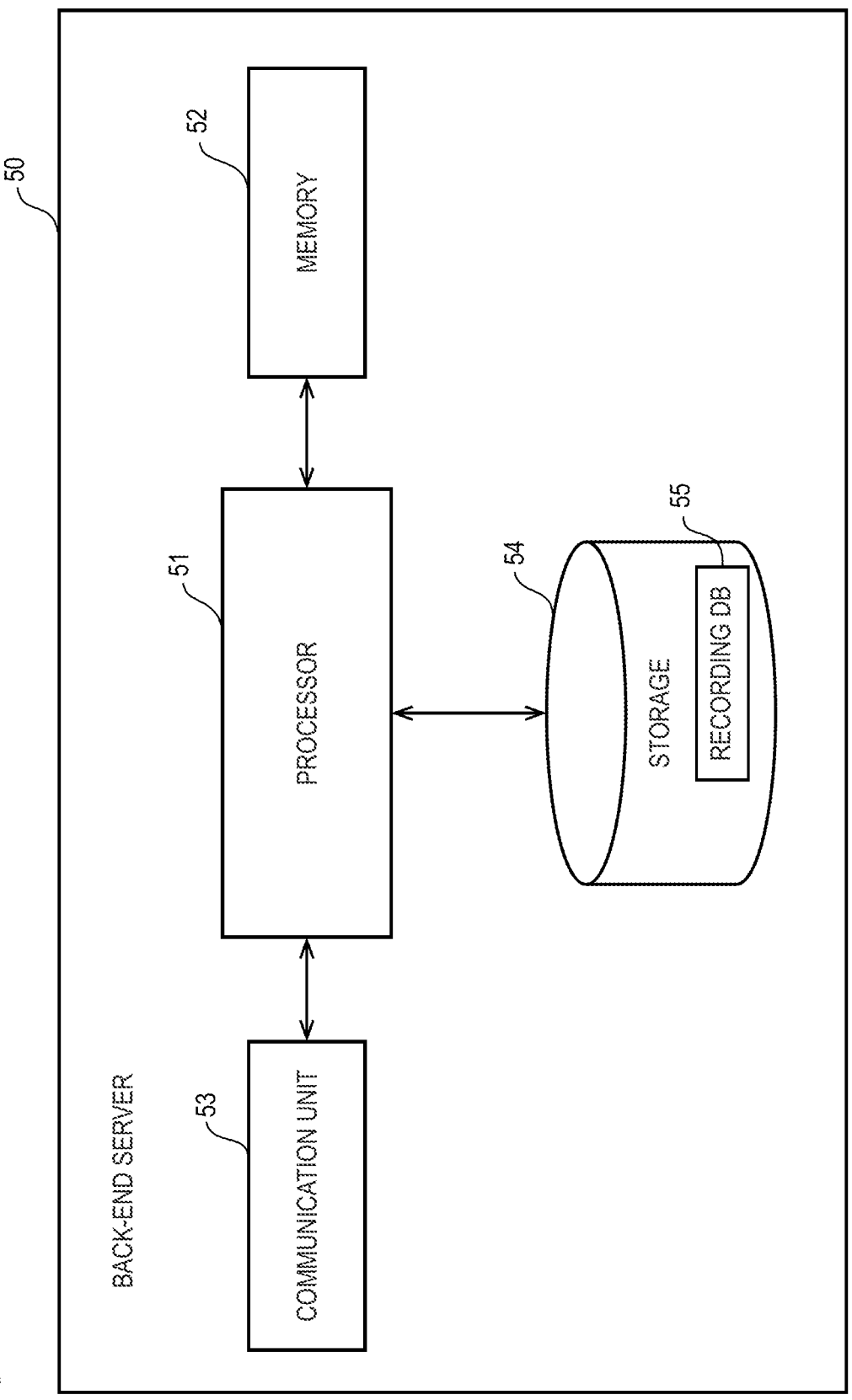
FIG. 4 is a block diagram showing a hardware configuration example of a back-end server.

FIG. 4 is a block diagram showing a hardware configuration example of the back-end server 50. The back-end server 50 is a server computer having high-performance specifications, and is connected to an intra-station network such as an intranet in the police station 8 (see FIG. 6) to perform data communication with the back-end client 80. As described above, the back-end server 50 can communicate with the wearable camera 10 wirelessly. The back-end server 50 has a configuration including a processor 51, a memory 52, a communication unit 53, and a storage 54.

The processor 51, as a control unit (controller) of the back-end server 50, executes various types of processing including signal processing, input/output processing, arithmetic processing, or storage processing by executing a program stored in the memory 52 by the processor 51, for example. The processor 51 is configured by using, for example, a central processing unit (CPU), a digital signal processor (DSP), a graphical processing unit (GPU), or the like. The processor 51 may also be configured by using a dedicated electronic circuit designed by an application specific integrated circuit (ASIC) or the like, or an electronic circuit designed to be reconfigurable by a field programmable gate array (FPGA) or the like.

The memory 52 is used as a working memory of the processor 51, and also stores various data, information, and programs. The memory 52 includes a primary storage device (for example, a random access memory (RAM) and a read only memory (ROM)). The memory 52 may include a secondary storage device (for example, a hard disk drive (HDD), a solid state drive (SSD)), or a tertiary storage device (for example, an optical disk, a SD card).

The communication unit 53 is connected to and communicates with each of the wearable camera 10 and the back-end client 80 via wireless or wired. The communication method of the communication unit 53 may include, for example, communication methods such as mobile communication such as wide area network (WAN), local area network (LAN), long term evolution (LTE), and 5G, power line communication, near field communication (for example, Bluetooth (registered trademark) communication), and mobile phone communication.

The storage 54 stores a recording database 55 in which the shift change information (see FIG. 7) is stored. In the attached drawings, the database is abbreviated as "DB" for convenience. In the recording database 55, for example, the captured video data obtained by the wearable camera 10 is stored. Further, in the recording database 55, the shift change information including a police officer ID and a password necessary for the police officer 7 to perform user authentication is registered for each police officer 7. This shift change information may be added, changed, or deleted by the operation of a managerial police officer using the back-end server 50 or the back-end client 80, and stored in the recording database 55.

Figure 5:
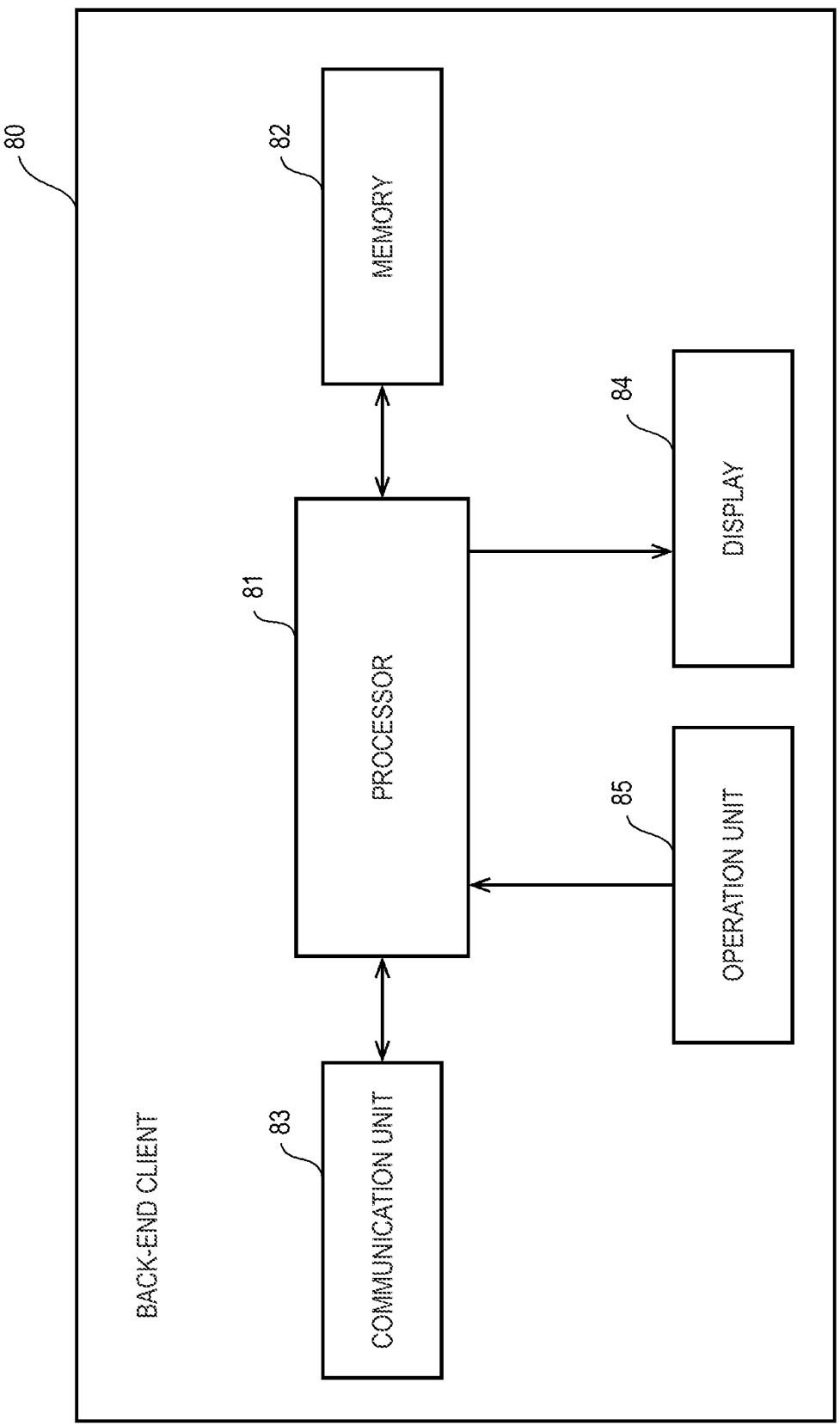
FIG. 5 is a block diagram showing a hardware configuration example of a back-end client.

FIG. 5 is a block diagram showing a hardware configuration example of the back-end client 80. The back-end client 80 is, for example, a personal computer, and is connected to an intra-station network such as an intranet in the police station 8 (see FIG. 6) to perform data communication with the back-end server 50. The back-end client 80 has a configuration including a processor 81, a memory 82, a communication unit 83, a display 84, and an operation unit 85.

The processor 81, as a control unit (controller) of the back-end client 80, executes various types of processing including signal processing, input/output processing, arithmetic processing, or storage processing by executing a program stored in the memory 82 by the processor 81, for example. The processor 81 is configured by using an MPU, a CPU, a DSP, a GPU, or the like. The processor 81 may also be configured by using a dedicated electronic circuit designed by an ASIC or the like, or an electronic circuit designed to be reconfigurable by an FPGA or the like.

The memory 82 is used as a working memory of the processor 81, and also stores various data, information, and programs. The memory 82 includes a primary storage device (for example, an RAM and an ROM). The memory 82 may include a secondary storage device (for example, an HDD, an SSD), or a tertiary storage device (for example, an optical disk, a SD card).

The communication unit 83 is connected to and communicates with the back-end server 50 via wireless or wired. The communication method of the communication unit 83 may include, for example, communication methods such as mobile communication such as WAN, LAN, LTE, and 5Q power line communication, near field communication (for example, Bluetooth (registered trademark) communication), and mobile phone communication.

Figure 8:
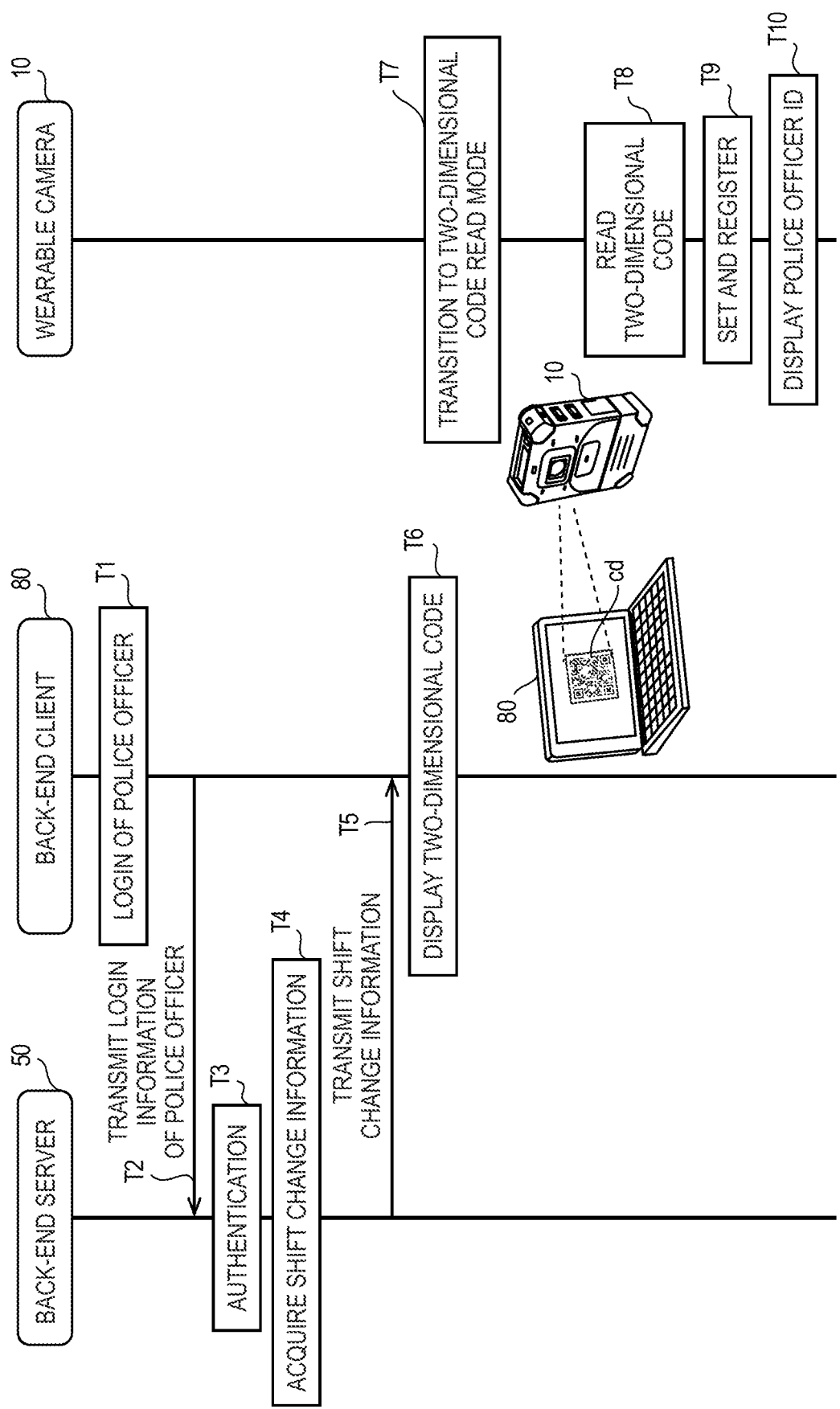
FIG. 8 is a sequence diagram showing an example of a user authentication operation procedure in the user authentication system according to the first embodiment.

The display 84 displays, for example, a login operation screen or a two-dimensional code cd for confirming whether to permit the user to log in to the user authentication system 5 (see FIG. 8). The display 84 is a display device such as a liquid crystal display device or an organic electronic luminescent (EL) device.

The operation unit 85 receives input according to the operation of the user, such as a user ID and a password during login. The operation unit 85 is an input device such as a mouse, a keyboard, a touch pad, a touch panel, or a microphone.

Next, an operation procedure of the user authentication system 5 according to the first embodiment will be described with reference to FIG. 6.

Figure 6:
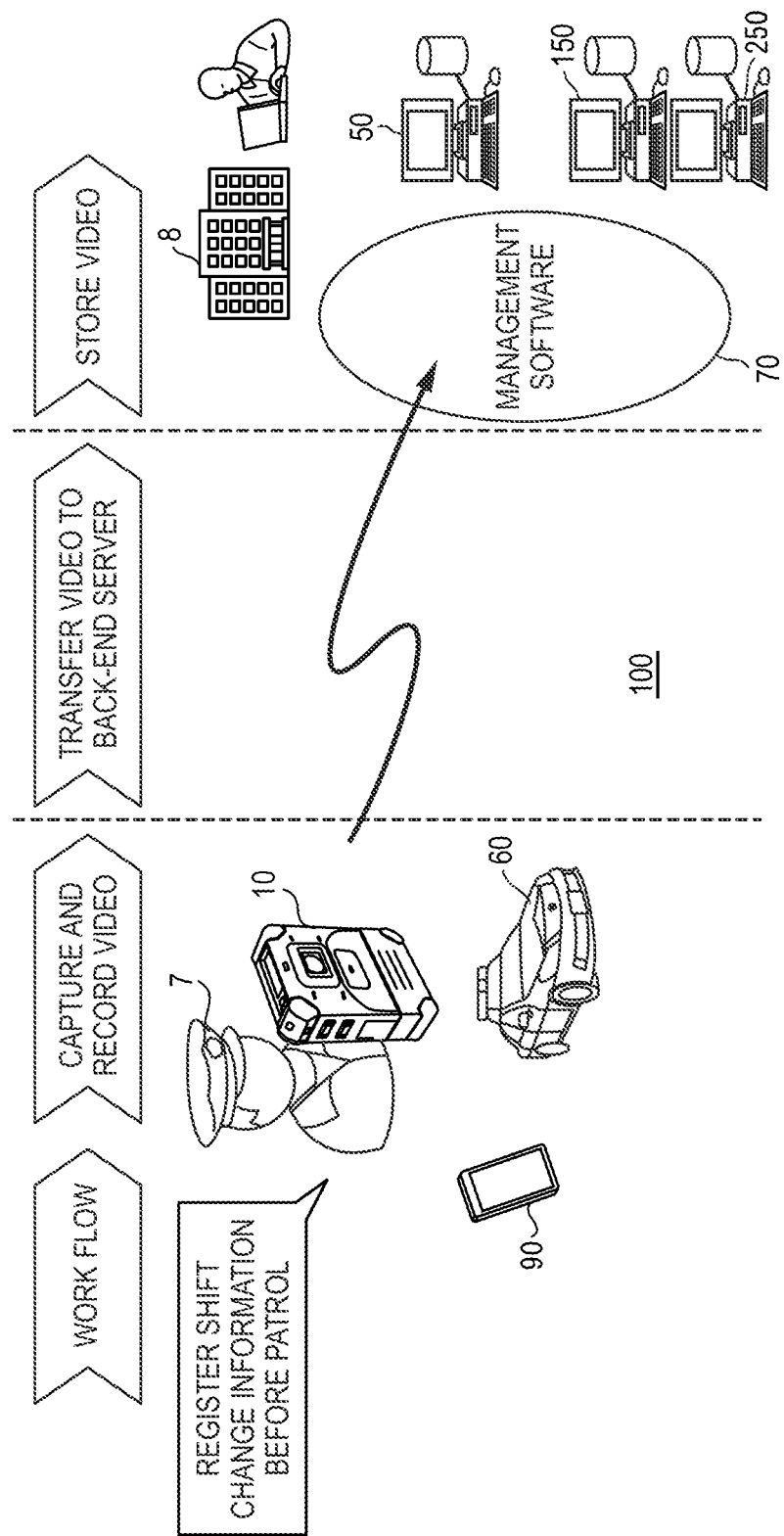
FIG. 6 is a diagram showing an outline of recording/transfer/storage operations for captured video performed by the wearable camera according to the first embodiment.

FIG. 6 is a diagram showing an outline of recording/transfer/storage operations for the captured video performed by the wearable camera 10 according to the first embodiment. A wearable camera system 100 includes a plurality of devices involved in various operations of recording, transferring, and storing the captured video data obtained by the wearable camera 10 worn by the police officer 7 on duty. Specifically, the wearable camera system 100 includes the wearable camera 10, the in car video system (ICV) 60 mounted on a police vehicle (for example, a patrol car), and a smart phone 90 possessed by the police officer 7 on duty. The in car video system 60 is mounted in a police vehicle, and specifically includes an in car camera, an in car recorder, an in car PC, and a communication unit (not shown). In addition to being capable of performing data communication with the back-end server 50 in the police station 8, the wearable camera 10 is also capable of performing data communication with the in car video system 60 or the smart phone 90.

In the wearable camera system 100, the wearable camera 10 captures the situation of the scene of the incident or the like as a video, and transfers the captured video data to, for example, the back-end server 50 in the police station 8. The back-end server 50 receives and stores the captured video data transferred from the wearable camera 10.

When dispatching from the police station 8 for a predetermined task (for example, patrol or emergency dispatch), the police officer 7 wears the wearable camera 10 and gets on a patrol car equipped with the in car video system 60 to head for the scene. The in car video system 60 captures, for example, based on the operation of the police officer 7, a video of the scene where the patrol car arrives with the in car camera of the in car video system 60. In addition, the wearable camera 10 allows the police officer 7 to get off the patrol car and capture a detailed video of the scene.

The captured video data obtained by the wearable camera 10 is stored in, for example, the RAM 13 or the storage unit 15 of the wearable camera 10, the in car recorder of the in car video system 60, or a memory of the in car PC. The wearable camera 10 transfers (uploads), to the back-end server 50, the captured video data stored in the storage unit 15.

The back-end server 50 is executably installed with management software 70 for communicating between servers 150 and 250 installed in the police station 8, the wearable camera 10, the in car video system 60, and the like. The management software 70 includes, for example, an application for managing personnel, i.e., the police officer 7, an application for managing allocation of the patrol car, and an application for managing take-out of the wearable camera

10. In addition, the management software 70 includes, for example, an application for searching and extracting captured video data satisfying attribute information input by the operation of the police officer 7 from a plurality of pieces of captured video data stored in the servers 150 and 250. The captured video data stored in the servers 150 and 250 may be used, for example, by a person in charge of a relevant department in the police station 8 for operation/verification of the incident, and, if necessary, the captured video data is copied to a predetermined storage medium (for example, DVD: digital versaille disc) and submitted as evidence in a predetermined scene (for example, a trial).

Before dispatching from the police station 8 to the scene and using the wearable camera 10, the police officer 7 performs an operation of registering, in the wearable camera 10, shift change information transmitted from the back-end server 50 at the police station 8. The shift change information includes the identification information of the police officer 7 (for example, Officer ID), identification information of the wearable camera 10 to be used by the police officer 7 (for example, Camera ID), and identification information of the patrol car to be used by the police officer 7 (for example, Car ID). The identification information is added to the captured video data. Therefore, based on the captured video data stored in the back-end server 50 and the servers 150 and 250, it can be clearly distinguished when and which police officer has captured the video using which wearable camera 10.

Figure 7:
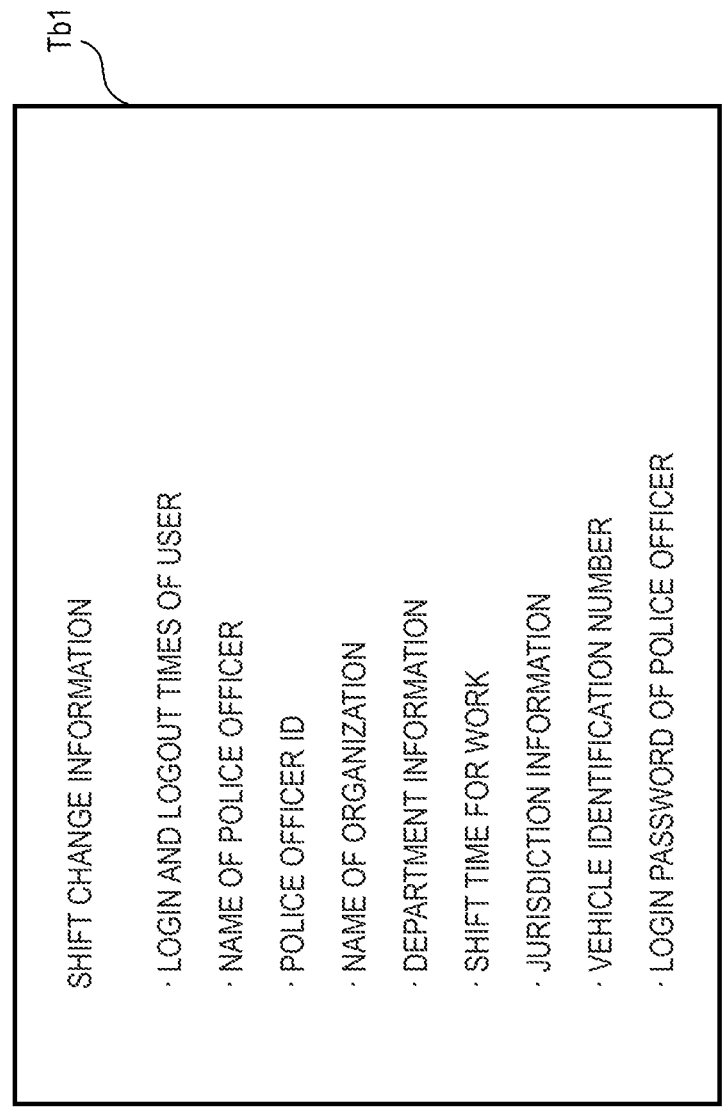
FIG. 7 is a diagram showing an example of registered contents of a shift change table in which shift change information is registered.

FIG. 7 is a diagram showing an example of registered contents of a shift change table Tb 1 in which the shift change information is registered. The shift change table Tb 1 is stored in, for example, the recording database 55 of the storage 54. In the shift change table Tb 1, a login time indicating a time when the user logs in to the user authentication system 5, a logout time indicating a time when the user logs out of the user authentication system 5, the name of the police officer, a police officer ID, the name of an organization to which the police officer belongs, department information to which the police officer belongs, a shift hour in which the police officer works daily, jurisdiction information indicating the jurisdiction where the police officer works daily, a vehicle identification number, and a login password of the police officer are registered in association with the police officer ID, for example. Here, the name of the police officer, the police officer ID, the name of the organization to which the police officer belongs, the department information to which the police officer belongs, and the login password of the police officer are fixed information that is not frequently changed. On the other hand, the login time and logout time of the user, the shift hour, the jurisdiction information, and the vehicle identification number are variable information that is updated daily.

In the wearable camera system 100, the police officer 7 can perform a login operation to the in car video system 60 when getting on the patrol car after wearing the wearable camera 10. During this login operation, for example, an operation unit of the in car PC is operated to input the identification information of the police officer 7, the identification information of the wearable camera 10 used by the police officer 7, and other information, similar to the registration of the shift change information to the wearable camera 10 using the user authentication system 5 in the police station 8. Various types of input information are stored in, for example, the in car recorder.

When the login to the in car video system 60 is normally completed, the in car video system 60 permits the police officer 7 to use the in car video system 60. That is, the in car video system 60 can be linked to the wearable camera 10 possessed by the police officer 7 after login. Accordingly, for example, the captured video data obtained by the wearable camera 10 can be transmitted to the in car video system 60 (for example, the in car recorder), and the police officer 7 can reproduce and confirm the contents of the captured video data by using the in car PC.

FIG. 8 is a sequence diagram showing a user authentication operation procedure in the user authentication system 5 according to the first embodiment.

In FIG. 8, before dispatching from the police station 8 to the scene and using the wearable camera 10, the police officer 7 performs a login operation to the back-end client 80 via the operation unit 85 of the back-end client 80 (T1). The back-end client 80 transmits login information of the police officer 7 input by the login operation of the police officer 7 to the back-end server 50 via the communication unit 83 (T2).

When receiving the login information of police officer 7 via the communication unit 53, the back-end server 50 searches the recording database 55 using this login information, and performs user authentication for the police officer 7 (that is, processing of determining whether the police officer 7 can use the wearable camera 10) (T3). When the authentication for the police officer 7 is normally completed (that is, the police officer ID included in the login information is registered in the recording database 55), the back-end server 50 acquires, from the recording database 55, the shift change information of the police officer 7 corresponding to the police officer ID used for user authentication (T4). The back-end server 50 may transmit an authentication OK response (Ack) to the back-end client 80 when the authentication for the police officer 7 is normally completed. The back-end server 50 transmits the shift change information of the police officer 7 to the back-end client 80 via the communication unit 53 (T5).

When receiving the shift change information via the communication unit 83, the back-end client 80 creates a two-dimensional code cd (for example, a two-dimensional bar code) indicating the content of the shift change information and displays the two-dimensional code cd on the display 84 (see T6, FIG. 8). Since a method of creating the two-dimensional code cd is a known technique, detailed description thereof will be omitted here. The two-dimensional code cd may be created by the back-end server 50 when the shift change information of the police officer 7 is created and registered in the recording database 55, and may be transmitted from the back-end server 50 to the back-end client 80. In this case, the processing of creating the two-dimensional code cd in the back-end client 80 can be omitted.

When the police officer 7 grasps the wearable camera 10 and long-presses the display button SW6, the wearable camera 10 is transitioned to from the default recording standby mode (see a display screen of the Officer ID in FIG. 9) to the two-dimensional code read mode (see a display screen of a QR CODE in FIG. 9) (T7). The display of the LCD 30 is transitioned from, for example, a recording standby screen in which the police officer ID is continuously displayed to a two-dimensional code read screen that enables the wearable camera 10 to read the two-dimensional code cd. When the police officer 7 presses the recording switch SW1 after transitioning to the two-dimensional code read screen, the wearable camera 10 reads the two-dimensional code cd displayed on the display 84 of the back-end client 80 (T8). The read of the two-dimensional code is performed by the police officer 7 capturing the two-dimensional code cd displayed on the display 84 of the back-end client 80.

The wearable camera 10 decodes the read two-dimensional code cd, and stores, sets and registers the shift change information obtained by the decoding in the RAM 13 (T9). When the registration of the shift change information is completed, the shift change information of the police officer 7 is registered, so that the wearable camera 10 can be substantially used. That is, pre-setting processing for the police officer 7 to use the wearable camera 10 is normally completed. When the pre-setting processing is normally completed such that the wearable camera 10 can be used, the police officer 7 can operate the wearable camera 10. Thereafter, the wearable camera 10 automatically transitions from the two-dimensional code read mode to the recording standby mode in response to the registration of the shift change information described above, and displays the police officer ID on the LCD 30 (T10). The transition to the recording standby mode can also be performed by the police officer 7 long-pressing the display button SW6.

FIG. 9 is a diagram showing a transition example of the screen displayed on the LCD 30 of the wearable camera 10. On the LCD 30 of the wearable camera 10, in the default recording standby mode, the police officer ID (Officer ID) is displayed. When the display button SW6 is long-pressed in the default recording standby mode, the display content of the LCD 30 is transitioned from actual data of the police officer ID (for example, "0123456" or the like) displayed in the recording standby mode to QR CODE characters displayed in the two-dimensional code read mode. When the read of the two-dimensional code cd is completed in the two-dimensional code read mode, the display content of the LCD 30 automatically transitions from the QR CODE characters displayed in the two-dimensional code read mode to the actual data of the police officer ID displayed in the recording standby mode. In addition, when the display button SW6 is long-pressed by the operation of police officer 7 during the two-dimensional code read mode, the display content of the LCD 30 transitions from the QR CODE characters displayed in the two-dimensional code read mode to the actual data of the police officer ID displayed in the recording standby mode.

In the default recording standby mode, every time the police officer 7 performs a short press operation, the display content of the LCD 30 transitions from the actual data of the police officer ID displayed in the recording standby mode to actual data corresponding to each mode shown in FIG. 9. This transition of the display content is executed by the MCU 19 of the wearable camera 10 based on the short press operation of the police officer 7 on the display button SW6. For example, the display content is periodically transitioned in the order of police officer ID→identification information of police vehicle (for example, Vehicle ID)→free content-→current date (for example, 9:16 am on Sep. 8, 2019) →service set identifier (SSID) when the wearable camera 10 functions as an access point→communication status (for example, Traffic)→police officer ID.

Other Operation Examples

Figure 10:
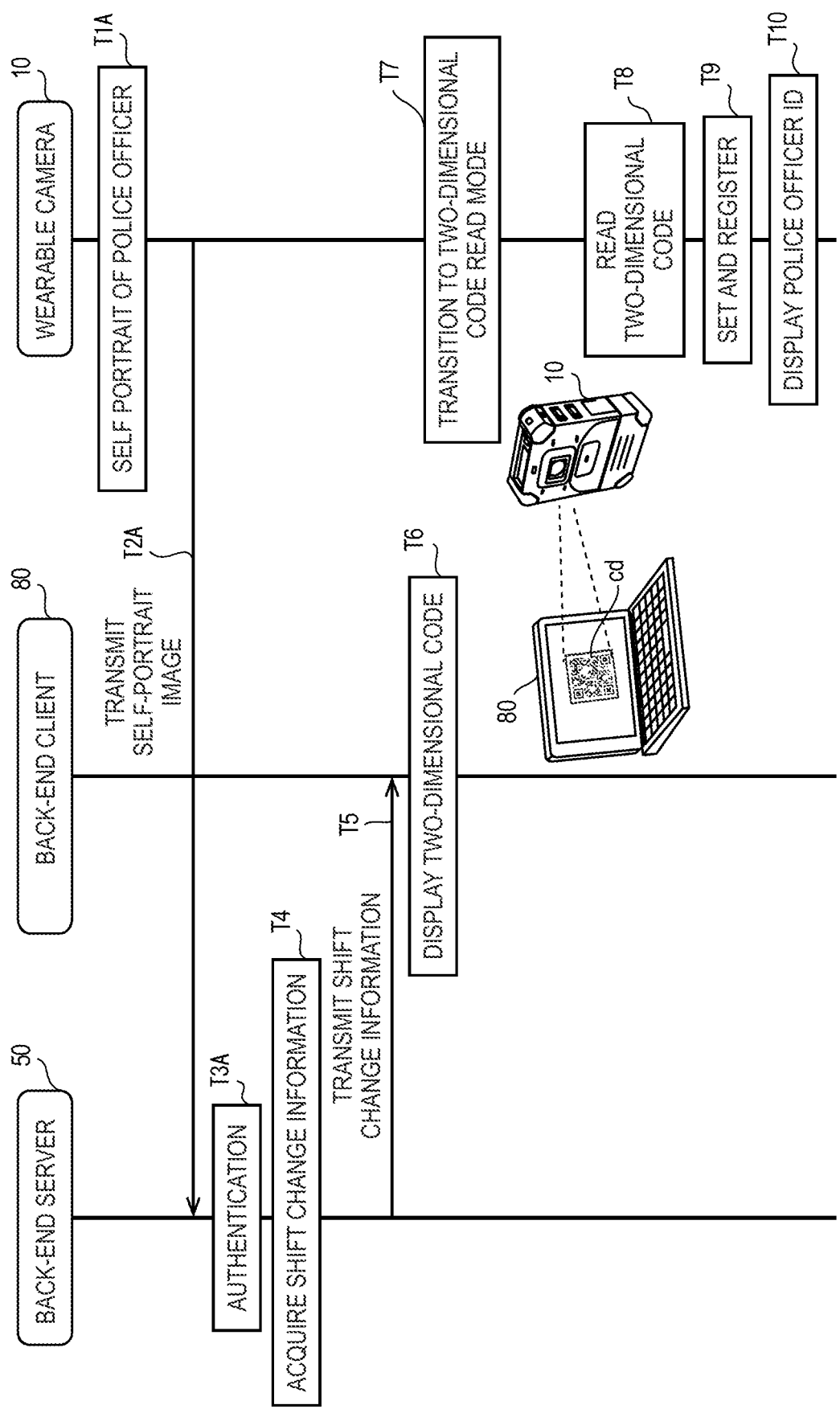
FIG. 10 is a sequence diagram showing another example of the user authentication operation procedure in the user authentication system according to the first embodiment.

FIG. 10 is a sequence diagram showing another example of the user authentication operation procedure in the user authentication system 5 according to the first embodiment.

In FIG. 10, in a procedure T1A, the police officer 7 captures a self-portrait image (that is, an image of a still image (so-called snapshot) of the face of the police officer 7) with the wearable camera 10 (T1A), instead of the police officer 7 performing a login operation to the back-end client 80 in the procedure T1 in the example of the user authentication operation procedure shown in FIG. 8.

In a procedure T2A, the wearable camera 10 transmits self-portrait image data obtained in the procedure T1A to the back-end server 50 (T2A), instead of the back-end client 80 transmitting the login information of the police officer 7 to the back-end server 50 in the procedure T2. This transmission may be executed in a wireless environment such as a wireless LAN constructed in the police station 8, or may be executed after the wearable camera 10 and the back-end server 50 are connected via a wired cable or the like.

In the procedure T3A, the back-end server 50 recognizes the face of the police officer 7 reflected in the self-portrait image perform user authentication based on feature data indicating data of feature points seen in a face image of the police officer registered in advance in the storage 54 (T3A), instead of the back-end server 50 using the login information of the police officer 7 to perform user authentication in the procedure T3. Since the procedures after the procedure T3A are the same as those in the user authentication operation procedure shown in FIG. 8, the description thereof will be omitted.

In another example of the operation procedure shown in FIG. 10, the user authentication for the police officer 7 is possible simply by taking a self-portrait image with the wearable camera 10, and the operation of the police officer 7 inputting the login information to the back-end client 80 can be omitted. Therefore, the time and labor required for setting and registering the shift change information can be reduced in the user authentication system 5.

Thus, in the user authentication system 5 according to the first embodiment, the wearable camera 10 reads the two-dimensional code displayed on the display 84 of the back-end client 80, and sets the shift change information including the police officer ID and the password obtained by decoding the two-dimensional code in the wearable camera 10. When the setting of the police officer ID and the password is completed, the wearable camera 10 displays the police officer ID on the LCD 30. Since the shift change information includes fixed information such as a police officer ID and a password, and variable information such as jurisdiction information and vehicle identification number of the patrol car, the wearable camera 10 can also set variable information at the same time. Therefore, the work of the police officer is greatly reduced as compared with a case where the wearable camera used by the police officer is set by directly inputting information such as the police officer ID and the password. For example, the work that requires about 5 minutes for direct input is reduced to about 1 minute for reading a two-dimensional code. Here, assuming that 2,000 police officers are present at the police station and dispatch using a wearable camera every day, the reduced man-hour for one year is 2,920,000 minutes (=(5 minutes–1 minute)×2000 people×365 days). In addition, in the case of an urgent incident, a police officer can promptly set information such as a police officer ID and a password in the wearable camera and dispatch. This speeds up the response to the incident.

The wearable camera 10 is to be worn by the police officer 7 (an example of a user). The wearable camera 10 includes the capturing unit 11 configured to capture a target, and the MCU 19 (an example of a processor) configured to read the two-dimensional code cd in which the fixed information and the variable information of the police officer 7 are registered via the capturing unit 11 and to decode (extract) the fixed information and the variable information of police officer 7.

The MCU 19 registers the decoded fixed information and variable information of the police officer 7 in the RAM 13 (memory), and when the registration of the fixed information and the variable information of the police officer 7 in the RAM 13 is completed, permits the police officer 7 to use the wearable camera 10.

Accordingly, user authentication including setting of a user work schedule that can be changed daily can be efficiently and quickly performed in the wearable camera 10, so that it is possible to support improvement of user work efficiency.

In addition, the wearable camera 10 further includes the LCD 30 (an example of a display) configured to display the police officer ID (an example of the fixed information) of the police officer 7 based on an instruction of the MCU 19 after permitting the police officer 7 to use the wearable camera 10. Accordingly, the police officer 7 can visually recognize a user authentication result when his/her police officer ID is displayed on the LCD 30.

In addition, the wearable camera 10 further includes the display button SW6 (an example of an operation unit) configured to receive the operation of the police officer 7. When the display button SW6 is long-pressed by police officer 7, the MCU 19 transitions an operation mode of the wearable camera 10 from the recording standby mode (an example of a normal operation mode) to the two-dimensional code read mode in which the two-dimensional code is readable. Accordingly, the police officer 7 can transition the operation mode of the wearable camera 10 to the two-dimensional code read mode at any timing.

In addition, when the display button SW6 is long-pressed by the police officer 7, the MCU 19 transitions the operation mode of the wearable camera 10 from the two-dimensional code read mode to the recording standby mode. Accordingly, the police officer 7 can easily switch the operation mode of the wearable camera 10 from the two-dimensional code read mode to the recording standby mode.

The two-dimensional code is displayed on the display 84 of the back-end client 80, which is different from that of the wearable camera 10. The MCU 19 decodes (extracts) the fixed information and the variable information of the police officer 7 based on an image of the two-dimensional code displayed on the display 84 and captured by the capturing unit 11. Accordingly, the police officer can set the fixed information and the variable information in the wearable camera 10 without performing an input operation except for a login operation. Therefore, the setting time of the fixed information and the variable information can be significantly shortened, and the work efficiency can be improved in the wearable camera 10.

The fixed information includes at least the police officer ID and the password stored in the captured video data obtained by the capturing unit 11. The variable information includes at least the shift hour (an example of a working hour) in which the police officer 7 works, the jurisdiction information (an example of jurisdiction area information), and the vehicle identification number of the patrol car (an example of an in-use vehicle information). Accordingly, in the wearable camera 10, the operation of inputting the police officer ID and the password is unnecessary, and the working hour of the user, jurisdiction area information, and in-use vehicle information that are updated daily can reliably be acquired.

When the back-end server 50 completes the user authentication based on the login information (an example of user information) input to the back-end server 50 (example of a device), the MCU 19 reads the two-dimensional code displayed on the display 84 of the back-end client 80 by using the capturing unit 11. Accordingly, a correct two-dimensional code that has been authenticated by the user can be read, and spoofing can be prevented in the wearable camera 10.

Further, the wearable camera 10 includes the communication unit 21 configured to communicate with the back-end server 50. The communication unit 21 transmits, as user information, the self-portrait image data of the police officer 7 captured by the capturing unit 11 to the back-end server 50. The MCU 19 reads the two-dimensional code displayed when the user authentication is completed, based on the self-portrait image data received by the back-end server 50. Accordingly, login operations of a police officer ID and a password in the back-end server 50 are unnecessary in the wearable camera 10. Therefore, the police officer 7 can set the fixed information and the variable information in the wearable camera 10 without any input operation, and further improvement of the work efficiency can be achieved.

Although the embodiment is described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that they also belong to the technical scope of the present disclosure. Each component in the various embodiments described above may be combined arbitrarily in the range without deviating from the spirit of the invention.

For example, the code displayed on the display of the back-end client is a QR code (registered trademark) which is a two-dimensional code, but a bar code, a color code, or the like may be used.

INDUSTRIAL APPLICABILITY

The present disclosure is useful as a wearable camera, a user authentication system, and a user authentication method which efficiently and quickly perform user authentication including setting of a user work schedule that can be changed daily, and support improvement of user work efficiency.

The present application is based upon Japanese Patent Application (Patent Application No. 2020-007060 filed on Jan. 20, 2020), the content of which is incorporated herein by reference.

What is claimed is:

1. A wearable camera that is wearable by a user, the wearable camera comprising:
   a memory;
   a capturing unit that is configured to capture and read a code in which fixed information and variable information of the user are registered; and
   a processor that is configured to extract the fixed information and the variable information of the user based on a read result of the capturing unit, wherein
   the processor is configured to
      register the extracted fixed information and variable information of the user in the memory, and permit the user to use the wearable camera based on the registration in the memory.

2. The wearable camera according to claim 1, further comprising:

a first display that is configured to display, based on an instruction from the processor, the fixed information of the user after the user is permitted to use the wearable camera.

3. The wearable camera according to claim 1, further comprising:
an operation unit that is configured to receive an operation of the user, wherein
the processor is configured to
change, based on the operation of the user on the operation unit, an operation mode of the wearable camera from a normal operation mode in which the capturing unit captures an image to a read mode in which the capturing unit captures and reads the code.

4. The wearable camera according to claim 3, wherein the processor is configured to change, based on the operation of the user on the operation unit, the operation mode of the wearable camera from the read mode to the normal operation mode.

5. The wearable camera according to claim 1, wherein the code is displayed on a second display provided separately from the wearable camera, and
the processor is configured to
extract, based on a capturing of the code displayed on the second display by the capturing unit, the variable information and the fixed information of the user.

6. The wearable camera according to claim 1, wherein the fixed information includes at least an ID and a password of the user stored in captured video data obtained by the capturing unit, and
the variable information includes at least a working hour of the user, allocated area information, and in-use vehicle information.

7. The wearable camera according to claim 5, wherein the processor is configured to read the code displayed on the second display in response to success of authentication for the user by a server based on login information to a user authentication system input to the server.

8. The wearable camera according to claim 1, further comprising:
a communication unit that is configured to communicate with a server, wherein
the communication unit is configured to transmit a self-portrait image of the user captured by the capturing unit to the server, and
the processor reads the code displayed on a second display in response to success of authentication for the user based on the self-portrait image of the user received by the server.

9. A user authentication system comprising:
a wearable camera that is wearable by a user; and
an information processing device that is communicatively connected to the wearable camera, wherein
the information processing device includes
a first processor that is configured to send a request to a database to acquire fixed information and variable information of a user whose login has been successfully completed, the database that stores data including fixed information and variable information for each user,
a communication unit that is configured to receive the fixed information and the variable information of the user sent from the database based on the request, and
a display that is configured to display a code, including the fixed information and the variable information of the user, generated by the first processor,
the wearable camera includes
a capturing unit that is configured to capture and read the code displayed on the display, and
a second processor that is configured to extract the fixed information and the variable information of the user based on a read result of the capturing unit, and
the second processor is configured to
register the extracted fixed information and variable information of the user in a memory, and permit the user to use the wearable camera based on the registration in the memory.

10. A user authentication method performed by a wearable camera that is wearable by a user, the user authentication method comprising:
capturing and reading, by a capturing unit of the wearable camera, a code in which fixed information and variable information of the user are registered;
extracting the fixed information and the variable information of the user based on a read result of the capturing unit; and
registering the extracted fixed information and variable information of the user in a memory, and permitting the user to use the wearable camera based on the registration in the memory.

* * * * *